United States Patent [19]
Luif et al.

[11] Patent Number: 5,850,569
[45] Date of Patent: Dec. 15, 1998

[54] METHOD FOR INTEGRATING A MODULE INTO A STORAGE LIBRARY

[75] Inventors: Richard Alan Luif, Broomfield; Timothy Alan Shafer, Fort Collins, both of Colo.

[73] Assignee: Storage Technology Corporation, Louisville, Colo.

[21] Appl. No.: 635,251

[22] Filed: Apr. 12, 1996

[51] Int. Cl.⁶ .................................................. G06F 11/22
[52] U.S. Cl. ..................... 395/830; 395/183.01
[58] Field of Search ................ 395/183.01, 183.12, 395/183.2, 183.22, 823, 830, 200.52, 200.51, 200.5, 653; 324/510; 248/676

[56] References Cited

U.S. PATENT DOCUMENTS

| | | | |
|---|---|---|---|
| 4,864,511 | 9/1989 | Moy et al. | 364/478.06 |
| 4,991,196 | 2/1991 | Krebs | 379/27 |

*Primary Examiner*—Dinh C. Dung
*Attorney, Agent, or Firm*—Timothy R. Schulte

[57] ABSTRACT

A method for modifying an information storage library. The invention includes a method for testing a new library storage module (LSM) to be added or included in the library. The method uses a portable simulated Library Management Unit (LMU) to test the new LSM prior to its incorporation into the library. Prior testing reduces down time of an existing information storage library when a new LSM is added.

23 Claims, 6 Drawing Sheets

```
MM/DD/YY hh:mm:ss: <<DGE>> SHOW

TEST ID   DEVICE TYPE   TEST SUMMARY
 0410      4410/9310    Roll Sensor Initialization
 0420      4410/9310    Wrist Initialization
 0430      4410/9310    Reach Initialization
 0440      4410/9310    Finger Initialization
 0450      4410/9310    Z Initialization
 0460      4410/9310    Theta Initialization
 0470      4410/9310    Camera/Lamp Initialization
 0480      4410/9310    PTP Initialization
 0510      4410/9310    Roll Motions
 0520      4410/9310    Wrist Motions
 0530      4410/9310    Reach Motions
 0550      4410/9310    Z Motions
 0560      4410/9310    Theta Motions
 0580      4410/9310    PTP Motions
 05d0      4410/9310    Roll-Wrist Concurrent Motions
 05e0      4410/9310    Roll-Wrist-Z Concurrent Motions
 05f0      4410/9310    Roll-Wrist-Z-Theta Concurrent Motions
 0810      4410/9310    Move a diagnostic cartridge
 0820      4410/9310    Mount and Dismount a diagnostic cart
 0830      4410/9310    Swap a diagnostic cartridge to another
 0910      4410/9310    Master PTP Load Test
 0920      4410/9310    Slave PTP Load Test
 0e20      4410/9310    Extended Cartridge Motion
 0f30      4410/9310    LSM Access Door Interlock
 0f50      4410/9310    LSM CAP Door Interlock
 0f60      4410/9310    LSM CAP Door Interlock (Clipper)
 0fb0      4410/9310    LSM Transport Communications
 0fe0      4410/9310    Array Tilt
 0430        9360       Reach Initialization
 0450        9360       Z Initialization
 0460        9360       Theta Initialization
 0480        9360       PTP Initialization
 0530        9360       Reach Motions
 0550        9360       Z Motions
 0560        9360       Theta Motions
 0580        9360       PTP Motions
 05f0        9360       Z-Theta Concurrent Motions
 0810        9360       Move a diagnostic cartridge
 0820        9360       Mount and Dismount a diagnostic cart
 0830        9360       Swap a diagnostic cartridge to another
 0e20        9360       Extended Cartridge Motion
```

FIG. 5

METHOD FOR INTEGRATING A MODULE INTO A STORAGE LIBRARY

BACKGROUND OF THE INVENTION

1. Field of the Invention

The invention relates to the field of information processing system organization. More particularly, the invention relates to modifying an information storage system. In still greater particularity, the invention relates to a method for increasing the capacity of an information storage system. By way of further characterization, but not by way of limitation thereto, the invention is a method for integrating a storage module with other modules in a library system while minimizing system downtime.

2. Description of the Related Art

An automated cartridge system (ACS) is described in U.S. Pat. No. 4,864,511 issued to Moy et al on Sep. 5, 1989 and assigned to Storage Technology Inc., the assignee of the present application. U.S. Pat. No. 4,864,511 is hereby incorporated by reference and made a part hereof. Library systems as described in that patent are sold by Storage Technology. The system described in that patent includes one or more library storage modules which taken together comprise a library. When a customer purchases a library system he specifies how many library storage modules (LSM) are required. As a customer's business grows he often desires to add one or more LSMs to his existing library.

A LSM is a rather large 12 sided structure, typically measuring about 12 feet in diameter and about 8 feet high. Because of the difficulty in transporting a fully assembled LSM, an LSM is usually assembled on-site and connected to other modules after assembly and testing. Testing is required to insure that, for example, the walls of the LSM are perpendicular to the floor and that the robot contained within the module is fully functional and can access all storage cells in the module.

In order to test an LSM which is to be integrated into the library, all operating conditions must be encountered. As can be expected, such a complete testing procedure takes a significant amount of time, usually a few hours. Because the customer desires as little disruption to his operations as possible, this testing and connection operation is usually scheduled on holidays or weekends and usually during off hours. Typically, Sunday mornings from 2–4 AM are used for this purpose. Significant customer access to data during this time is not required and the customer may, in effect, shut down his operations.

Thus, there is a narrow window for the service personnel to test and connect the additional LSM. If a significant problem occurs during testing or if a defective part is encountered, there is no time to correct the problem or order and install an additional part.

It would be desirable to test the new LSM prior to installation in order to determine whether or not it is fully operational to allow the technicians to concentrate on connecting the additional LSM to the library without addressing issues surrounding the performance of the LSM. Because the LSM is generally assembled on-site, there is no opportunity for pretesting of the LSM prior to shipping.

SUMMARY OF THE INVENTION

The invention is a method to allow easier integration of a new library storage module (LSM) into an existing information storage library containing one or more operating library storage modules. The method may also be used in construction of an entirely new library with multiple modules to reduce the time required to debug the system. The invention includes a method for testing a new library storage module (LSM) to be added or included in the library. The method uses a portable simulated Library Management Unit (LMU) to test the new LSM prior to its incorporation into the library. Prior testing reduces down time of an existing information storage library when a new LSM is added. Prior testing will also allow an entirely new library to be more efficiently brought online.

The method includes performing diagnostic testing on an LSM using a simulated Library Management Unit (LMU). The simulated LMU includes a self contained library processor card, a LAN interface card, and power attachments to conventional 110 V outlets. Testing protocols performed by soft ware instructions are executed through the library processing card via a maintenance device to emulate LMU operation. Testing of the operation of the robotic means and various other subsystems of the LSM may be accomplished prior to integrating the new LSM with the other LSM(s).

BRIEF DESCRIPTION OF THE DRAWINGS

FIG. 5 is a table listing the series of diagnostic tests to be performed on a LSM prior to its becoming operational.

DESCRIPTION OF THE PREFERRED EMBODIMENT

Figure 1:
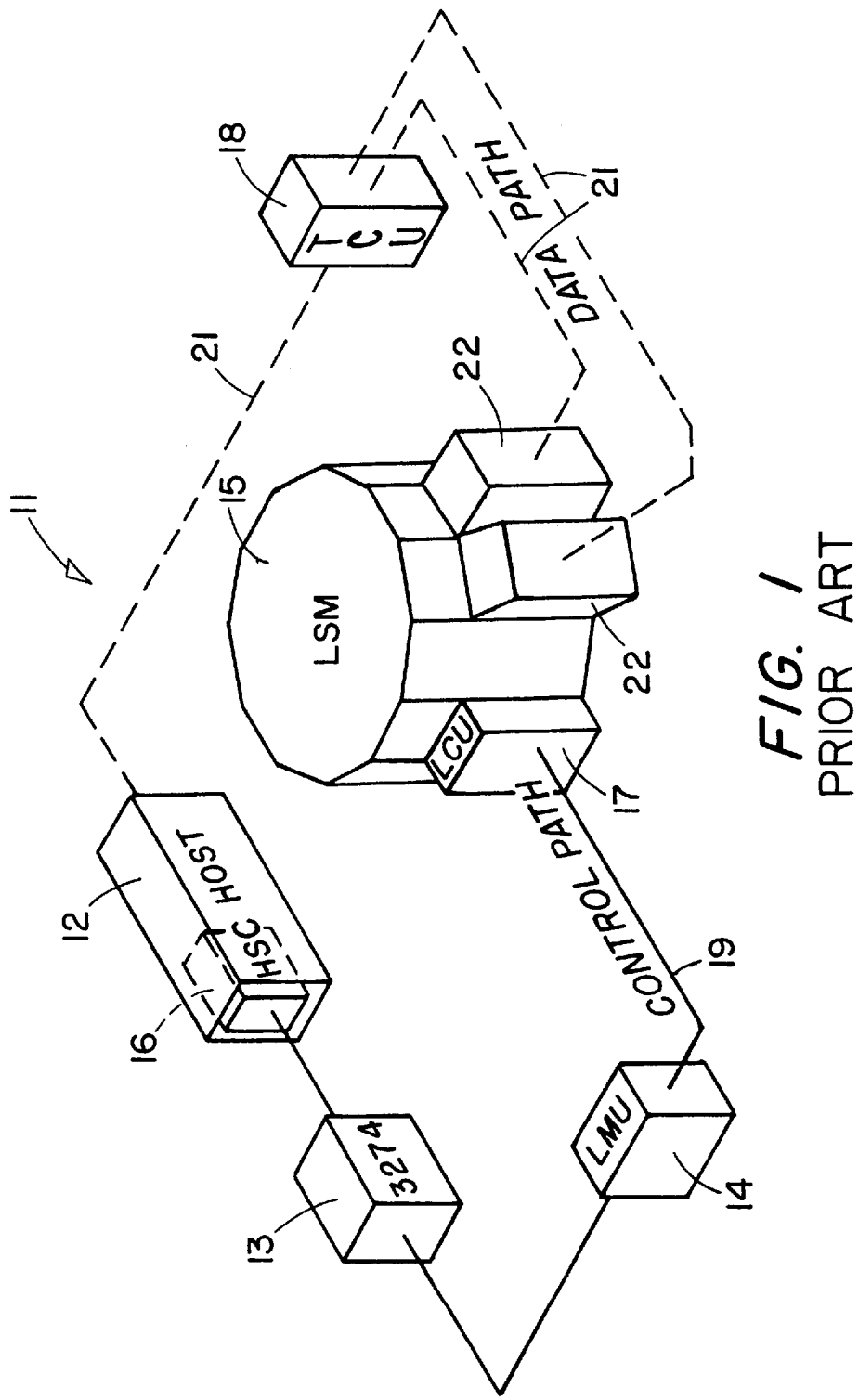
FIG. 1 illustrates an automated cartridge system as is known in the art.
Figure 2:
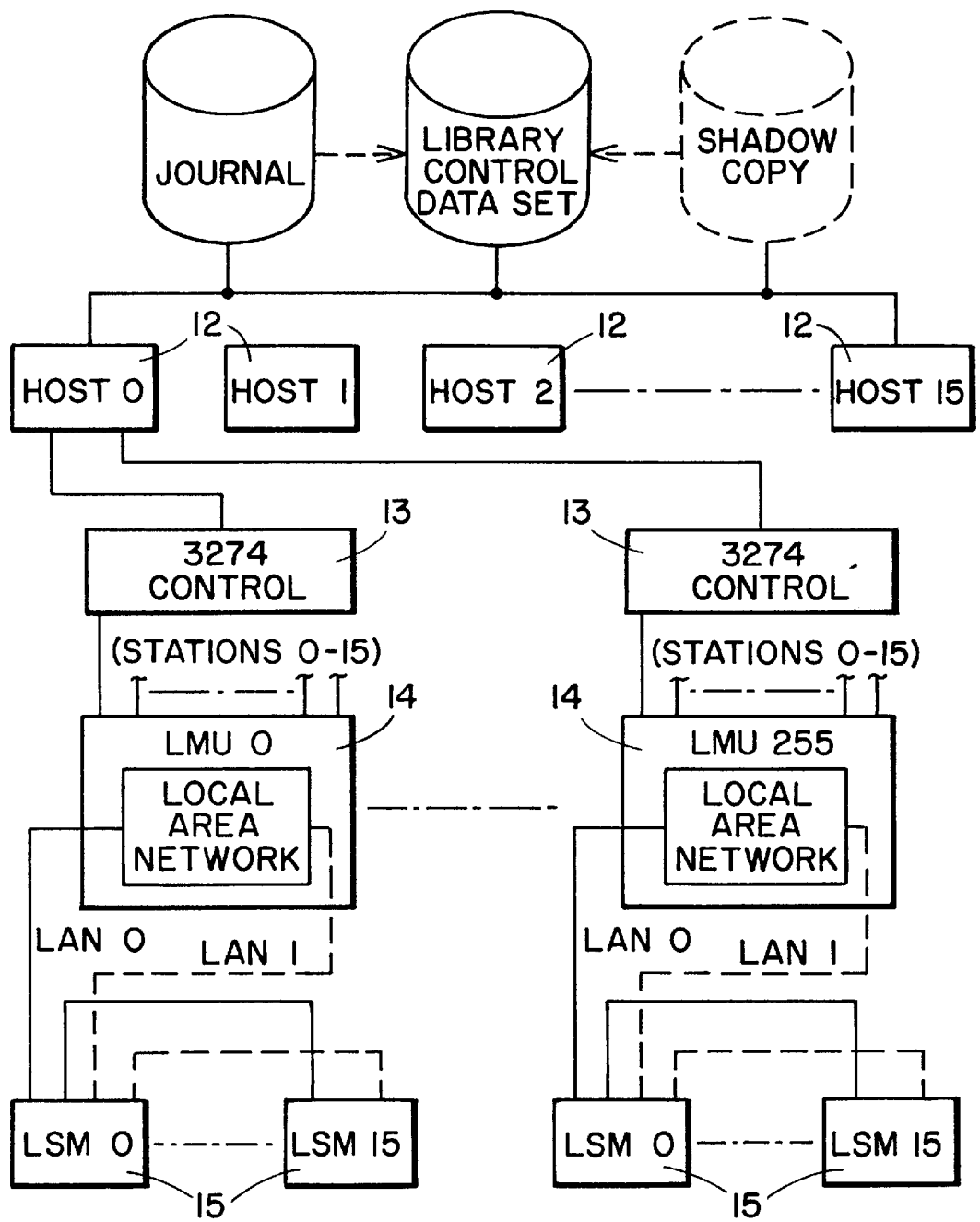
FIG. 2 is a block diagram of an expanded automated cartridge system as is known in the art.

Referring now to the drawings wherein like reference numerals denote like structure throughout each of the various figures, FIG. 1 illustrates an automated cartridge system (ACS) generally designated by the reference numeral 11. ACS 11 is designed to operate with an IBM (International Business Machines Corp.), or IBM-compatible host computer 12 capable of communication with a conventional terminal controller 13 such as the 327X-type controller. ACS 11 includes a library management unit (LMU) 14 and a library storage module (LSM) 15. ACS 11, through its associated host software component (HSC) 16, enables storage and retrieval of magnetic tape cartridges of the IBM 3480-type for use by the host computer 12 across a conventional channel. Typically, a single LSM can store up to 6000 tape cartridges. Each LMU 14 serves as the library controller and provides the interface between from one to sixteen host computers 12 and up to 16 LSMs 15, as shown in FIG. 2. LMU 14 thus acts as an outboard controller and interprets commands from the host computers 12, relaying appropriate instructions to LSM 15 via a control path 19 (shown in solid lines) and a library control unit (LCU) 17. On the other hand, the read/write data path 21 (dashed lines) comes directly from the host computer 12, through a tape control unit 18 to the tape transport unit/cartridge drive 22 thereby separating control signals from data signals.

Each LSM 15 provides the necessary mechanisms for automated cartridge handling. It not only provides the storage area for magnetic tape cartridges utilized in the system, but also includes an optical system for identifying the correct cartridge, a servo-controlled, electromechanical means of selecting the proper cartridge and delivering it to the correct tape drive, and a suitable housing to ensure operator safety and data security. As shown in greater detail in FIGS. 3 and 4, a LSM 15 is comprised generally of an outer housing 23 which includes a plurality of wall segments 24 attached to a floor 25 and disposed about vertical axis A. An inner wall 27 having a plurality of segments 26 forming an upper portion 28 which is suspended from a ceiling 29 of the LSM 15, and another plurality of segments 26 forming a lower portion 31 which is mounted upon the floor 25, supports a first cylindrical array 32 of storage cells 33 centered about the vertical axis A. A second cylindrical array 34 of storage cells 33 is concentrically arranged about the first array 32, mounted upon the wall segments 24 of the outer housing 23.

Figure 3:
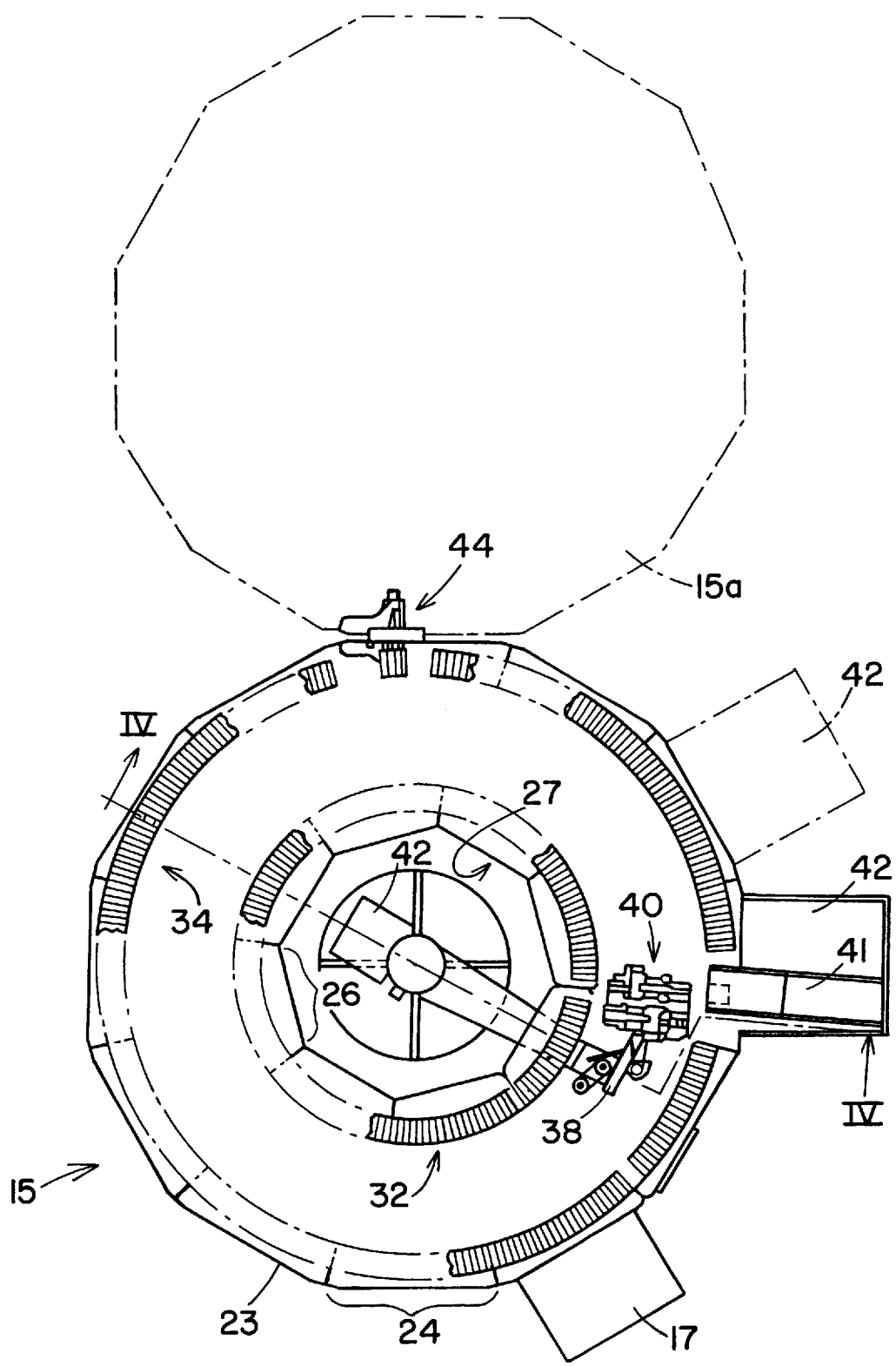
FIG. 3 illustrates in plan view, partially cut away, a prior art library storage module with its associated tape drives and library control unit.
Figure 4:
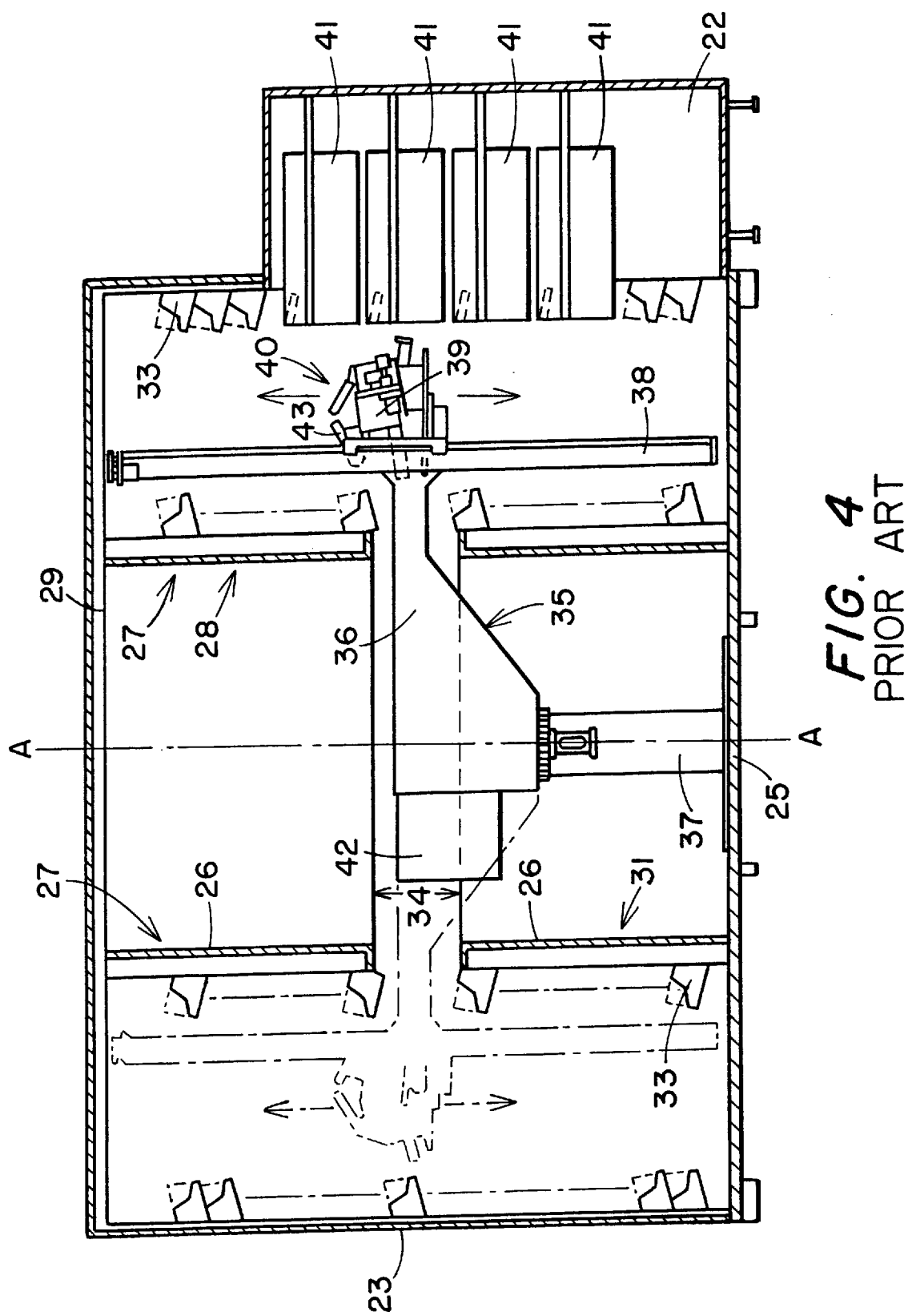
FIG. 4 illustrates in elevational view the library storage module and associated tape units of FIG. 3 along lines IV—IV.

As shown in FIG. 4, when viewed in conjunction with FIG. 3, it can be seen that an access path 34 is formed between the upper and lower portions 28 and 31 in order that an arm assembly portion 35 of a robotic means 40 may rotate about the vertical axis A between the first and second cylindrical arrays 32 and 34. The arm assembly portion 35 includes a theta arm 36 rotatably mounted upon a support column 37 which is attached to the floor 25. The arm assembly portion 35 further includes a Z-mechanism 38 attached to the end of the theta arm 36 remote from the support column 37. A wrist assembly 39, coupled to the Z-mechanism 38, enables up-and-down motion as indicated by the arrows in FIG. 4 for storage and retrieval of magnetic tape cartridges contained within storage cells 33, and for loading and unloading of the tape cartridges within a selected tape transport 41 of cartridge drive 22 attached to the side of the LSM 15. Each LSM 15 is capable of supporting up to sixteen tape transports 41, four such tape transports 41 being arranged vertically on top of one another within a particular cartridge drive 22.

In conjunction with LMU 14 and library control unit (LCU) or inboard controller 17, the robotic means 40 shown in FIGS. 3 and 4 is capable of transferring selected ones of the plurality of magnetic tape cartridges contained within the storage cells 33 between their substantially upright storage positions and the substantially horizontal transducing position at an available tape transport 41. The LMU 14, as previously described, interprets commands from the host computers 12 and optimizes the motion of the robotic means 40 to maximize media handling performance. Each LCU 17, on the other hand, provides the interface between the LMU 14 and the robotic means 40, interpreting commands from the LMU 14 and executing motion control sequences of the robotic means 40 within the LSM 15. A remote electronics interface (REI) 42 is physically mounted upon the robotic means 40. REI 42 contains amplifiers, power and logic circuits (not shown) necessary to drive the robotic means 40 and to utilize a vision system 43 which is used to locate tape cartridges in bins 33 and tape transports 41.

Referring again to FIG. 3, it may be desirable to add one or more additional library storage modules (LSM's) 15a to increase the library capacity. In that event a device such as a pass through port 44 is used to move tape cartridges from one library storage module 15 to an additional library storage module 15a and vice versa. As can be appreciated, an LSM as described above is rather complex and requires precision in assembly of the various components to ensure correct placement of the tape cartridges in storage cells 33, tape transports 41 and pass through ports 44. As described above, this precision in assembly is difficult to accomplish because the library storage module must normally be assembled at the customer site due to its relatively large size and weight. As further discussed above, the time window for accomplishing this task is rather narrow because the operation of the existing library storage modules of the customer is adversely affected during such assembly. Operation of the robotic means 40 is of paramount importance. Various time consuming tests must be conducted during and after assembly of new LSM 15a.

Referring to FIG. 5, a list of the tests required to be performed on a LSM prior to its becoming operational is shown. Three columns are shown in FIG. 5. The left column lists the Test ID number, the second column lists the type or model of LSM to be tested and the third column is a summary of the type of test. There are multiple types of LSMs which are offered by StorageTek. The Models 4410 and 9310 are larger libraries while the 9360 is a smaller version. The types of tests to be performed involve three general categories: 1. robotic means motion; 2. pass through port motion; and 3. LSM communication and operation. Test Ids 0410, 0420, 0430,0440, 0450, 0460, and 0470 relate to initialization of the robotic means in the first category. This initialization essentially calibrates the robotic means to a home position as a reference point. Test ID 0480 performs the same type of test for the pass through port 44 and is part of the second category of testing. The series of tests beginning with the digits "05" are used to test the actual motion of the apparatus with tests 0510,0520, 0530, 0540, 0550, 0560, 05d0, 05e0 and 05f0 relating to the robotic means 40. Test 0580 relaters to the motion testing for the pass through port.

As stated above, the third category of tests relate to communication within and operation of the LSM within the library. The tests 0810, 0820, 0830 and 0e20 actually move tape cartridges within the LSM to test correct positioning and operation of the robotic means and communication from LMU 14. The "0f" series of tests relate to the testing of the cartridge access port of the LSM where it is so equipped. That is, in the 4410 and 9310 models of the library a refrigerator door type of device is located on outer housing 23 of the LSM to allow the placing of tape cartridges into storage cells on the open door from outside the library. The door is preferably hinged and, when closed, allows the robotic means 40 to access the cartridges on the door. In this way cartridges may be added to or removed from the library. Tests 0f50 and 0f60 check the correct operation of this door in cooperation with the robotic means. An access door is also provided for human entry into LSM should that be required. This door is also located in outer housing 23 of LSM 15. Test 0f30 ensures that this door may be secured and that the robotic means is disabled if this door is utilized to prevent injury due to a collision between the robotic means and a human entering the LSM.

The final two tests in the series are the 0fb0 and 0fe0 tests. The 0fb0 provides a method of troubleshooting communication problems between tape transports 41 and LCU 17. This ensures placement of a tape cartridge by robotic means 40 into the correct transport 41 where information may be read to host 12 through tape control unit 18. Test 0fe0 is designed to check for tilted arrays within LSM 15. That is, the arrays of storage cells must be aligned correctly with respect to robotic means 40 to ensure maximum performance.

As may be appreciated, the assembly and testing of an LSM requires a significant expenditure of time and effort. Because the time allotted for such activities is generally dictated by the customer who desires as little down time as possible, these activities must be performed as quickly and accurately as possible when the operating equipment of the customer is involved. The present method alleviates many of these problems by utilizing a portable LMU which can be used during assembly and testing of an LSM thereby eliminating most, if not all, of the down time otherwise required from the customer operating equipment.

Figure 6:
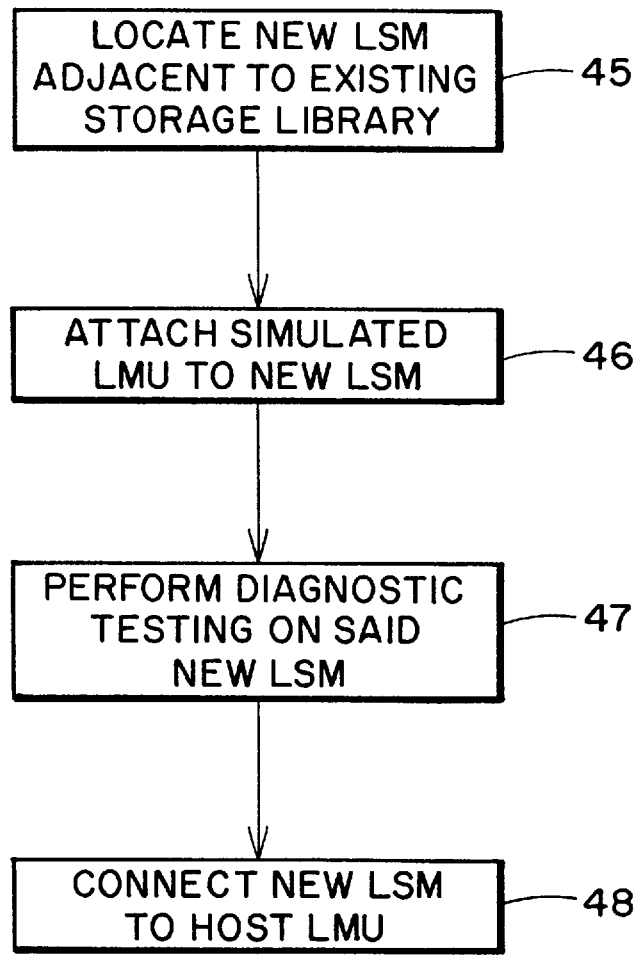
FIG. 6 is a flow chart illustrating the preferred embodiment of the method of the present invention.

Referring to FIG. 6, at step 45 an LSM to be included in a library is assembled. Once assembled, or in some cases, contemporaneously with assembly, a simulated LMU is connected at step 46 to the LSM to be included in the library. Diagnostic testing is performed at step 47 to ensure the correct operation of the LSM. Once the diagnostic testing has been accomplished, the LSM is connected to the host LMU at step 48 and the LSM becomes an operational part of the library. Some testing operations may still be required when the LSM is integrated into the library. For example, testing of the LAN operation, LMU configuration with respect to the added storage cells 33 on walls 32 and 34 of the LSM, inventory of the customer tape cartridges, and operation of pass through port 44 may be done after integration. However, using the present method, many of the testing functions as described above can be performed prior to shutting down the customer system which reduces the time that the customer system is down.

The simulated LMU which is used with the present method may be contained in a standard size suitcase and may be easily transported and attached to the LSM to be tested. It essentially consists of a microprocessor card such as the 80386 card manufactured by Intel Corp. with initialization and card function specialization firmware embedded thereon, an interface LAN card used for external communication, an 80Mb hard drive upon which the LMU software resides, and a DC power supply that is driven by 110 V AC. The LMU software allows specific routines and complex functions such as LAN communications protocol and LSM command protocols to be implemented through the operating system.

While the invention has been disclosed with respect to a preferred embodiment thereof it is not to be so limited as changes and modifications may be made which are within the full intended scope of the invention as defined by the appended claims. For example, while the LSMs contemplated herein are rather large, the size of the LSM should not be considered a limitation. Larger or smaller LSMs may advantageously employ the claimed method. In addition, while the method of the invention is primarily used in situations where an LSM is added to an existing operational library, it may also be used where multiple LSMs are being used to build a new library. The LSM to be added or included is constructed in proximity to the existing LSM(s) or to the LSM(s) to be incorporated into the new library. As used herein "in proximity" is meant to mean that the LSM is located such that it may be connected by a pass through port to the existing or other LSM(s).

What is claimed is:

1. A method for modifying an information storage library including the step of constructing a second library storage module (LSM) in proximity to a first LSM, said first LSM connected to a host library management unit (LMU), said method comprising the steps of:

connecting a simulated LMU to said second LSM;

utilizing said simulated LMU to perform diagnostic testing on said second LSM wherein said diagnostic testing includes:

measuring the motion functions of a robotics means in said second LSM;

measuring the motion functions of a pass through port in said second LSM;

measuring the Local Area Network (LAN) communication and operation between said second LSM and said information storage library;

measuring the alignment of storage cells in said second LSM with a robotics means in second LSM; and integrating said second LSM into said information storage library.

2. A method according to claim 1 wherein said step of measuring the motion functions of a robotics means in said LSM includes the step of calibrating said robotics means to a home position as a reference point.

3. A method according to claim 1 wherein said step of measuring the Local Area Network (LAN) communication and operation includes the step of testing the operation of a cartridge access port in cooperation with said robotics means.

4. A method according to claim 1 wherein said step of measuring the Local Area Network (LAN) communication and operation includes the step of testing an LSM access door interlock.

5. A method according to claim 1 wherein said step of measuring the Local Area Network (LAN) communication and operation includes the step of testing communication between a tape transport and a library control unit.

6. A method according to claim 1 wherein said step of measuring the Local Area Network (LAN) communication and operation includes the step of testing the alignment of storage cells in said LSM with said robotics means.

7. A method according to claim 1 wherein said step of integrating includes connecting said second LSM and the aforesaid first LSM to said pass through port.

8. A method for performing diagnostic testing on a second library storage module (LSM) to be added to an existing information storage library, said existing information storage library including at least a first LSM and a library management unit (LMU) to control the functions of said first LSM, said method including the step of constructing said second library storage module (LSM) in proximity to said first LSM, said method comprising the steps of:

connecting a simulated LMU to said second LSM;

instructing said simulated LMU to perform said diagnostic testing, said step of instructing further including the step of entering a set of instructions onto a microprocessor card in said simulated LMU; and integrating said second LSM into said existing information storage library.

9. A method according to claim 8 wherein said diagnostic testing includes measuring the motion functions of a robotics means in said second LSM.

10. A method according to claim 8 wherein said diagnostic testing includes measuring the motion functions of a pass through port in said second LSM.

11. A method according to claim 8 wherein said diagnostic testing includes measuring the Local Area Network (LAN) communication and operation between said second LSM and said existing information storage library.

12. A method according to claim 9 wherein said step of measuring the motion functions of a robotics means in said LSM includes the step of calibrating said robotics means to a home position as a reference point.

13. A method according to claim 10 wherein the aforesaid step of integrating includes connecting said second LSM and the aforesaid first LSM to said pass through port.

14. A method according to claim 8 wherein said diagnostic testing includes measuring the alignment of storage cells in said second LSM with a robotic means in second LSM.

15. A method according to claim 11 wherein said step of measuring the Local Area Network (LAN) communication and operation includes the step of testing the operation of a cartridge access port in cooperation with said robotics means.

16. A method according to claim 11 wherein said step of measuring the Local Area Network (LAN) communication and operation includes the step of testing an LSM access door interlock.

17. A method according to claim 11 wherein said step of measuring the Local Area Network (LAN) communication and operation includes the step of testing communication between a tape transport and a library control unit.

18. A method for testing a library storage module (LSM) comprising the steps of: connecting a simulated LMU to said LSM;

utilizing said simulated LMU to perform diagnostic testing on said LSM by entering a set of instructions onto a microprocessor card in said simulated LMU wherein said diagnostic testing includes:

measuring the motion functions of a robotics means in said LSM;

measuring the Local Area Network (LAN) communication and operation between said LSM and said simulated LMU; and measuring the alignment of storage cells in said LSM with a robotics means in said LSM.

19. A method according to claim 18 wherein said step of measuring the motion functions of a robotics means in said LSM includes the step of calibrating said robotics means to a home position as a reference point.

20. A method according to claim 18 wherein said step of measuring the Local Area Network (LAN) communication and operation includes the step of testing the operation of a cartridge access port in cooperation with said robotics means.

21. A method according to claim 18 wherein said step of measuring the Local Area Network (LAN) communication and operation includes the step of testing an LSM access door interlock.

22. A method according to claim 18 wherein said step of measuring the Local Area Network (LAN) communication and operation includes the step of testing communication between a tape transport and a library control unit.

23. A method according to claim 18 wherein said step of measuring the Local Area Network (LAN) communication and operation includes the step of testing the alignment of storage cells in said LSM with said robotics means.

* * * * *